Patented Nov. 16, 1943

2,334,564

UNITED STATES PATENT OFFICE 2,334,564

ANTIOXIDANT COMPOSITION

Harry F. Lewis, Appleton, Wis., assignor, by mesne assignments, to The Pacific Lumber Company, San Francisco, Calif., a corporation of Maine No Drawing. Application July 12, 1939, Serial No. 283,993

9 Claims. (Cl. 252—404)

The present invention, a continuation-in-part of my co-pending application, Serial No. 245,678, filed December 14, 1938, now Patent No. 2,214,-251, relates to antioxidant compositions and processes of preparing the same. More specifically the present invention relates to antioxidant compositions particularly adapted for use in stabilizing hydrocarbons of the type derived from petroleum. The claims of the co-pending application are directed to water soluble tannin and related phlobaphene "extracts" while the claims of the present continuing application are directed to "distillates" obtained by the destructive distillation of alcohol soluble tannin and phlobaphene extracts.

Many compositions including synthetic products and so-called natural products have been suggested heretofore for use as oxidation inhibitors. A representative antioxidant frequently prepared by a synthetic process and considered to be one of the potent compositions on the market today, is a compound known as catechol, i. e. o-dihydroxy benzene. A representative natural antioxidant of value for use in anti-knock gasolines is a tar obtained in the destructive distillation of hard wood. While the antioxidants discovered by prior investigators have found wide use, the art has long recognized the need for improved antioxidants of relatively low cost, together with commercially practical processes of producing the same.

Therefore, the principal object of the present invention is to provide improved antioxidant compositions of relatively low cost.

Another object of the present invention is to provide an improved process for preparing potent antioxidant compositions.

Other objects will be apparent as the description hereinafter proceeds.

I have discovered that California redwood (i. e. the soft wood or conifer known as *Sequoia sempervirens*) is a potential source of new antioxidant compositions and intermediates thereof. I have also discovered that the antioxidant composition made up of tannins and related phlobaphenes (which possess unique antioxidant properties per se) as well as the antioxidant intermediates made up primarily of the water insoluble phlobaphenes (which are relatively inactive per se) can be readily extracted from redwood. I have further discovered that improved antioxidant compositions may be obtained from the redwood extract containing the tannin and the phlobaphene compositions, by the destructive distillation of the extract per se, i. e. in the absence of the wood and non-extractives contained therein.

My investigations have shown redwood to be unique as a wood in that it contains an unusually high percentage of the desired extractives, e. g. up to 32 percent, of peculiar redwood tannin and phlobaphene compositions. Ordinarily, for extraction, I prefer to use an alcoholic (ethanol) solvent using redwood flour made from redwood waste, e. g. sawdust, chips, slash and particularly the stumps and roots which contain an unusually high percentage of the redwood tannin and phobaphene compositions. Any of the well known extraction apparatus may be used as the extracting means and the products may be obtained in the usual manner by evaporation of the solvent. It will be understood that the suggested method outlined above is merely illustrative and that the present invention is not limited thereto. Any organic solvent that dissolves both the redwood tannins and the redwood phlobaphenes such as the esters including ethyl acetate, may be used in place of the ethyl alcohol solvent mentioned above. In commercial practice, the solvent is recovered and re-used as the extraction medium.

The destructive distillation of the wood-free tannin and phlobaphene extract is carried out in any type of distillation apparatus either at reduced pressures (e. g. 30 mm. to 100 mm.) or at atmospheric pressure. Investigations have shown that products obtained at relatively low pressures and consequently rather low distillation temperatures (e. g. 200° C.) are superior antioxidants. The yields of active antioxidant tar obtained at low temperatures are also considerably greater than the yields obtained at high temperatures, e. g. 375 to 400° C. Ordinarily, the temperature of the extract should be kept below 350° C., e. g. temperatures of 275°–300° C.

The crude tar distillate collected on destructive distillation (which includes some solid material, together with tar oil) is soluble in ether and possesses an antioxidant value approximating catechol. The phenolic fraction of the tar i. e. the portion soluble in aqueous alkali (e. g. sodium hydroxide) solutions possesses a greater antioxidant value than either the ether soluble tar or catechol.

In carrying out comparative tests the following standard antioxidant test using mineral oil was employed: A sample of 75 grams of oil was heated to about 134° C. in a constant temperature bath and oxygen was passed through the oil at the rate of 10 liters per hour, the oxygen being dispersed by means of a fritted glass gas distributor. The breakdown or change in the nature of the oil was followed by determining the development of acidity or rate of acid formation in a given sample.

Hydrocarbons first pass through an induction period during which no acid is formed. The difference in the time required to produce acids depends primarily on the type of oil being tested, on the nature of impurities present and on the amount and kind of inhibitors added. The mineral oil used in the tests shows a stop in its induction period at the end of about 1–1.5 hours. At the end of 2 hours treatment over 1 percent of the oil calculates to oleic acid. The following table gives some representative results obtained following the standard antioxidant test outlined above.

TABLE I

1. Mineral oil with no added antioxidant

| Hours of treatment | Percentage acid formation |
|---|---|
| 0.5 | 0.0 |
| 1.0 | 0.16 |
| 1.5 | 0.51 |
| 2.0 | 1.33 |
| 2.5 | 2.94 |

TABLE II

2. Mineral oil with catechol antioxidant

| Percent Antioxidant | Induction period |
|---|---|
| | Hours |
| 0.01 | 12.5 |

TABLE III

3. Mineral oil with ether soluble tar

| Percent antioxidant | Induction period |
|---|---|
| | Hours |
| 0.01 | 10–11 |

TABLE IV

4. Mineral oil with phenolic fraction of tar

| Percent antioxidant | Induction period |
|---|---|
| | Hours |
| 0.01 | 18–19 |

In the table (1) shows that in a blank run made with mineral oil and no added antioxidant, that the oil starts to break down after approximately 1–1.5 hours treatment; (2) shows that in a run made with mineral oil and 0.01 percent catechol, that the induction period is extended about 11 hours by the addition of the inhibitor; (3) shows that in a run made with mineral oil and 0.01 percent (total) ether soluble tar, that the induction period is extended about 9 hours; and (4) shows that a run made with mineral oil and 0.01 percent (alkali soluble) phenolic tar that the induction period is extended about 17 hours. The percentages of antioxidant used in the above table show that the crude tar approaches the relatively expensive catechol in antioxidant value and that the phenolic tar fraction possesses an antioxidant value of over 150 percent of the value obtained by using catechol in above standard tests.

The "destructive distillation" composition of the present invention should not be confused with the water soluble tannin and related phlobaphene "extract" described in my co-pending application. The composition of the present invention, for example, is directed to distillates obtained by destructive distillation of redwood extracts containing both the water insoluble (alcohol soluble) redwood phlobaphenes as well as the water soluble extract of my co-pending application. The process of the present invention makes it possible to convert the relatively inactive water insoluble phlobaphenes into potent antioxidant compositions while at the same time retaining to a substantial degree the desired antioxidant properties of redwood tannin.

The process of the present invention and the antioxidant compositions produced thereby should not be confused with processes or products obtained by the destructive distillation of wood. Investigations have shown destructive distillation carried out in the usual manner in the presence of redwood per se to result in the loss of substantial amounts of antioxidation compositions,—particularly the phenolic fraction. The destructive distillation of the extract in accordance with the present invention reduces phenolic loss and produces a phenolic tar having superior properties compared to the phenolic tars obtained by destructive distillation of the wood. Thus the phenolic tars, for example, obtained by the destructive distillation of wood (due to the wood fiber and other foreign materials contained therein) possesses relatively lower antioxidant properties compared to the phenolic tar product obtained by the destructive distillation of the redwood extract in accordance with the present invention.

In addition to the above the redwood extract has been found to lend itself readily to destructive distillation with the accumulation of the minimum of undesired residue. Wood on the other hand does not lend itself to a rapid and easy distillation and the enormous quantities of charcoal by product produced by the destructive distillation of wood has little call in the open market and its disposition presents a real problem to those attempting to operate under the old process. Of additional importance the present process has been found more economical due to lower overhead (e. g. heat, equipment, etc.) than the previously suggested processes.

The novel process of the present invention, although directed primarily to the preparation of antioxidant compositions, may be advantageously employed in the production of phenols from redwood. The present process, for example, not only gives more phenols per weight of distillation material but also gives more actual phenols calculated back to wood. The phenols (i. e. phenolic fraction) of the distillate may be extracted and separated from the non-phenolic tar fraction by extraction with aqueous alkali hydroxide solutions. The free phenolics in turn may be obtained by treating the alkali metal phenolates with dilute acids, e. g. sulphuric acid.

The improved antioxidant compositions produced by the present invention are relatively inexpensive and possess potent antioxidant properties. They may be used to advantage with all types of petroleum hydrocarbons, but have been found of particular value as an anti-sludging agent for use with the heavy mineral oils having boiling points of 150°–300° C. Ordinarily it is preferred to employ 0.001 to 0.1 antioxidant.

Although I have illustrated the present invention with certain preferred examples, it will be understood that the present invention is not limited thereto. The invention is deemed to cover all modifications coming within the spirit and scope of the claims annexed hereto.

I claim:

1. The improved process of preparing an antioxidant tar distillate containing substantial amounts of phenolic materials which comprises destructively distilling a wood-free redwood tannin and phlobaphene extract at temperatures not exceeding 350° C. and a pressure not exceeding atmospheric pressure.

2. The improved process of preparing a tar distillate containing a substantial amount of phenolic materials possessing potent antioxidant properties which comprises destructively distilling a wood-free alcoholic redwood extract at temperatures of 200° to 300° C. and a pressure below atmospheric pressure.

3. The process of producing a distillate containing phenolic materials which includes destructive distillation of a wood-free redwood ethanol extract consisting essentially of water insoluble phlobaphenes and water soluble tannins and related phlobaphenes, said distillation being carried out in a partial vacuum at temperatures below 300° C.

4. The process of preparing an antioxidant tar distillate which comprises treating redwood flour with ethyl alcohol so as to extract redwood tannins and phlobaphenes contained in said flour, separating the extract thus obtained from the remaining insoluble material, evaporating the ethyl alcohol from the extract, and then destructively distilling the resulting wood-free extract in a partial vacuum and at temperatures below 300° C.

5. The process of obtaining phenolic materials which comprises producing a redwood tar distillate in accordance with the process of claim 5, then subjecting said tar to a treatment with an aqueous solution of sodium hydroxide so as to extract and separate the phenolic fraction of said tar from the non-phenolic residue, and finally freeing the phenols by addition of dilute acid to the alkaline extract.

6. Redwood tar possessing improved antioxidant properties consisting of tar distillates obtained by destructively distilling a wood-free redwood tannin and phlobaphene extract at temperatures below 350° C. and a pressure not exceeding atmospheric pressure.

7. As a new product, a redwood tar containing a substantial amount of phenolic materials, consisting of tar distillates obtained by destructive distilling a wood-free redwood alcoholic extract at a temperature range of 200° to 300° C. and a pressure below atmospheric pressure.

8. As an antioxidant, a redwood tar distillate obtained by destructively distilling in a partial vacuum and at a temperature not exceeding 350° C. a wood-free ethanol redwood extract containing water insoluble phlobaphenes and water soluble tannins and related phlobaphenes.

9. As an antioxidant, redwood phenolics prepared by the process of claim 4.

HARRY F. LEWIS.